(12) United States Patent
Wolf

(10) Patent No.: US 9,650,210 B2
(45) Date of Patent: May 16, 2017

(54) CONTAINER-HANDLING INSTALLATION HAVING AN EXCHANGEABLE FORMAT PART

(71) Applicant: KHS GmbH, Dortmund (DE)

(72) Inventor: Uwe Wolf, Rüdesheim (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 14/896,501

(22) PCT Filed: May 27, 2014

(86) PCT No.: PCT/EP2014/060916
§ 371 (c)(1),
(2) Date: Dec. 7, 2015

(87) PCT Pub. No.: WO2014/195181
PCT Pub. Date: Dec. 11, 2014

(65) Prior Publication Data
US 2016/0130091 A1    May 12, 2016

(30) Foreign Application Priority Data
Jun. 7, 2013 (DE) .................. 10 2013 105 913

(51) Int. Cl.
*B65G 37/00* (2006.01)
*B65G 21/20* (2006.01)
*B65G 21/06* (2006.01)

(52) U.S. Cl.
CPC ......... *B65G 21/2072* (2013.01); *B65G 21/06* (2013.01)

(58) Field of Classification Search
CPC ........ B65G 37/00; B65G 47/84; B65G 21/20; B65G 21/06

USPC ......... 198/480.1, 478.1, 479.1, 481.1, 473.1, 198/474.1
See application file for complete search history.

(56) References Cited

U.S. PATENT DOCUMENTS

| | | | |
|---|---|---|---|
| 5,782,339 A | 7/1998 | Drewitz | |
| 5,784,857 A * | 7/1998 | Ford | B65B 35/26 198/473.1 |
| 7,832,546 B2 * | 11/2010 | Preti | B65G 29/00 198/473.1 |
| 8,312,985 B2 * | 11/2012 | Suther | B65G 29/00 198/473.1 |

(Continued)

FOREIGN PATENT DOCUMENTS

| | | |
|---|---|---|
| DE | 44 36 201 | 4/1996 |
| DE | 699 02 944 | 8/2003 |

(Continued)

*Primary Examiner* — James R Bidwell
(74) *Attorney, Agent, or Firm* — Occhiuti & Rohlicek LLP

(57) ABSTRACT

A container-handling installation includes an exchangeable format part for guiding containers, and a catch closure for connecting the format part in a releasable manner to a locking device. The catch closure has a catch on an upper format plane. The catch rotates between a first, in which it releases the format part, and a second position, in which it locks it. The catch closure fixes and braces the format part and locking device, which is oriented around the catch closure, has a vertical web with a locking tab corresponding to the catch. A connecting device arranged on a side of the locking device opposite the locking tab fixes the locking device to a body of the container-handling installation.

10 Claims, 1 Drawing Sheet

(56) References Cited

U.S. PATENT DOCUMENTS

2008/0279621 A1* 11/2008 Chaupin ............... F16L 37/088
   403/345

FOREIGN PATENT DOCUMENTS

| DE | 10 2009 018731 | 10/2010 |
| EP | 0 063 848 | 11/1982 |
| EP | 2 116 490 | 11/2009 |

* cited by examiner

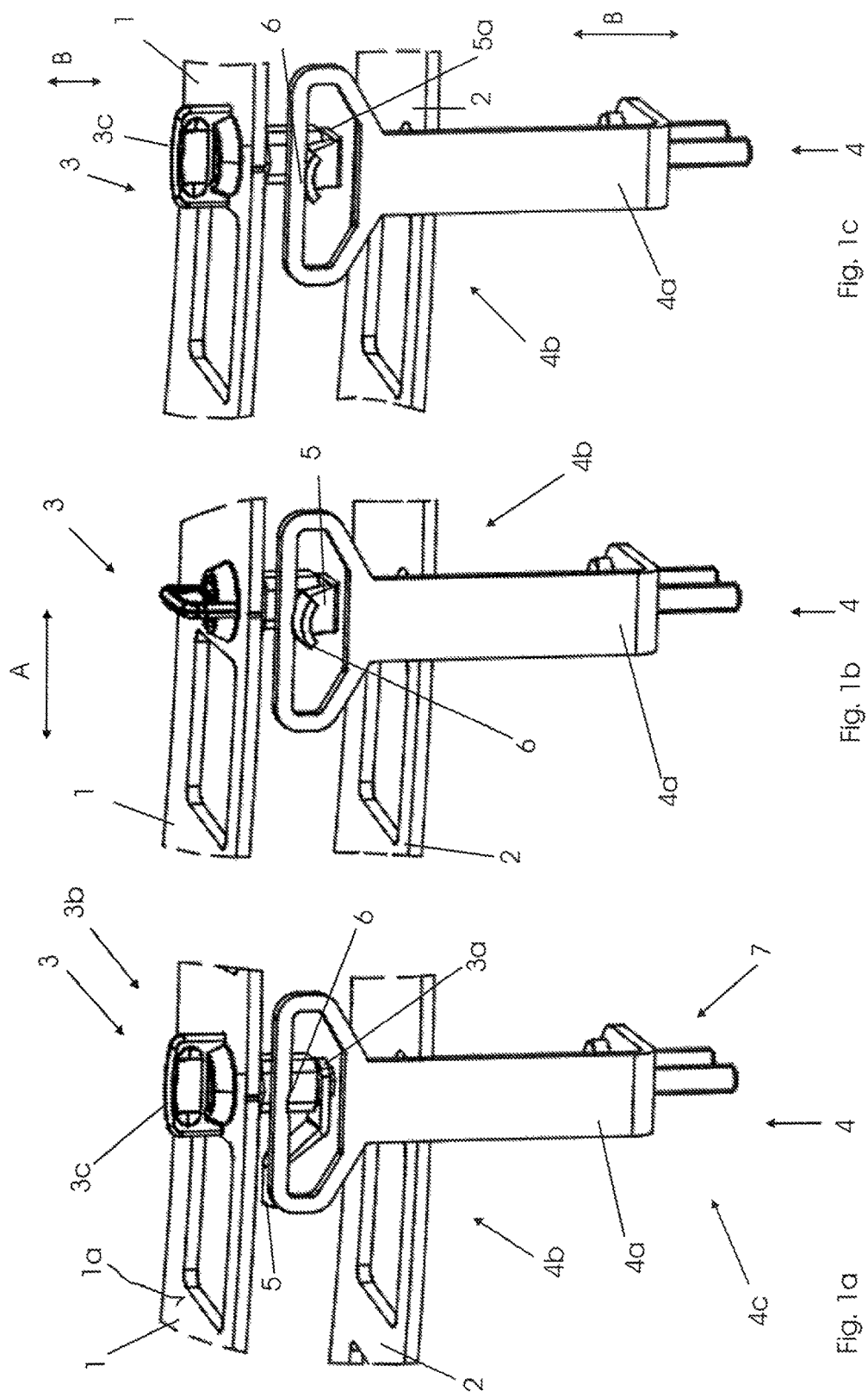

CONTAINER-HANDLING INSTALLATION HAVING AN EXCHANGEABLE FORMAT PART

RELATED APPLICATIONS

Under 35 USC 371, this application is the U.S. national stage of international application PCT/EP2014/060916, filed on May 27, 2014 which claims the benefit of the Jun. 7, 2013 priority date of German application DE102013105913.9, the contents of which are herein incorporated by reference.

FIELD OF INVENTION

The invention relates to a container-handling installations, and in particular, to exchangeable format parts for guiding containers through such installations.

BACKGROUND

A container-handling installation typically has guide units that guide containers through the installation. These guide units are useful for guiding containers as they move from one processing station to the next. Among the known guide units are rotary guide units, such as star-shaped format parts or plant portions in which the containers are processed.

In general, guide units are adapted to the properties of the containers that they are supposed to guide. These properties include, for example, container form, container weight, and/or container size. In general, a guide unit used for a large container may not work so well for a small container, and vice versa. As an example, the ideal contact point of the format part on a short bottle relative to its position in the container-handling installation is substantially lower than it would be for a tall bottle.

As a result, when a container processing installation is to be switched over to process different containers, it is sometimes necessary to change the guide units. For this reason, the guide units are at least partly exchangeable so that on conversion of the container-handling installation from a first container size to a second container size, format parts of the guide unit can be exchanged.

A difficulty that arises is that it becomes necessary to maintain a suitable inventory of various format parts for different container sizes and designs. Another difficulty is that having to change format parts is complex and difficult. Format parts are usually firmly bolted to a body of the container-handling installation. Undoing such bolted connections takes time. This represents down-time during which the container processing installation cannot be productive.

SUMMARY

Among the objects of the invention is that of providing a container-handling installation with a format part that is particularly easy to exchange.

A container-handling installation according to the invention includes an exchangeable format part for guiding containers and a catch closure for releasable connection of the format part to a locking device. The catch closure has a catch that rotates between first and second positions. In the first position, the catch releases the format part. In the second position, the catch locks the format part. The catch closure locks and braces the format part and the locking device along the longitudinal axis direction of the catch closure. Bracing firmly fixes the format part to the locking device so that the braced format part is firmly arranged in a fixed position. It also ensures secure attachment of the format part to the container-guiding installation.

In some embodiments, the catch closure is configured such that a first rotation of an actuation unit turns the catch from the first to the second position, and a further rotation braces the catch to the locking device.

Both the first and second rotation may be less than 360 degrees. Each rotation may, for example, be a quarter turn, or a 90-degree turn. In some embodiments, the rotation required to cause a transition between positions is less than 90 degrees. Among these are embodiments in which the required rotation is only 45 degrees. In other embodiments, the rotation required to cause a transition between positions is greater than 90 degrees. Among these are embodiments in which the required rotation is 135 degrees.

In some embodiments, a rotary axis connects the actuation unit to the catch. Among these are embodiments in which the rotary axis is arranged at a central position on the catch and embodiments in which it is arranged at an end portion of the catch. The positioning of the rotary axis on the catch depends on the necessary deflection of the catch from its first to its second position, or on its length for installation.

In some embodiments, the rotary axis is arranged along the longitudinal axis of the catch closure. Among these are embodiments in which the catch fits at a first end of the rotary axis, and a rotary device, such as an actuation unit for turning the bracing axis, fits on a second end of the rotary axis, which is opposite the first end. Embodiments include those in which a rotatable mounting arranges the rotary axis on the catch closure. In some embodiments, the rotary axis has two rotatable mountings, one in the region of an upper format part plane and one in the region of a lower format part plane.

Embodiments differ in the configuration of the locking device. In some embodiments, the catch engages behind a protrusion. In others, it engages a recess. In other embodiments, the locking device has a tab-like recess configured to engage the catch. This tab-like recess is arranged relative to the catch such that, on the rotary movement of the catch from the first to the second position, a free end of the catch engages the tab-like recess.

In some embodiments, the locking device has an engagement device corresponding to the catch. This helps to position and/or fix the catch in the tab-like recess. An example of an engagement device is a spring pin with a recess arranged on the catch. In some embodiments, the engagement device is a recess on the locking device that conforms to the shape of the catch. This results in a particularly simple way to fix the catch on the locking device.

In some embodiments, the locking device has a catch plate designed to correspond to the catch. Among these are embodiments in which the catch plate has a passage opening whose cross section is adapted to the cross section of the catch. In such embodiments, in its first alignment position, the catch passes through the passage opening, and in a second alignment position, the catch does not pass through the passage opening. A catch plate or catch plate with passage opening is particularly suitable for a compact design of the locking device.

In some embodiments, the catch starts by being arranged vertically above the plane of the catch plate. For fixing and bracing, the catch is guided into or through the catch plate. The locking, i.e. the fixing and bracing, then takes place in the region of the construction space of the catch plate. This ensures a particularly small size of the locking device.

In other embodiments, the locking device has a positioning device for positioning the format part. The positioning device inserts the format part, by connection or insertion, into its position in the container-handling installation. This allows the format part to be fixed, braced, and also correctly positioned in the container-handling installation.

In some embodiments, the positioning device is a format-part support for arranging the format part with a locking device. This permits a particularly compact construction of the locking device and the positioning device.

The format-part support positions the format part in a predefined installation position in the container-handling installation. In some embodiments, the format-part support fixes an installation height of the format part.

Some embodiments achieve a particularly secure bracing of the format part to the container-handling installation by having the catch closure pass through the format part.

In some of these embodiments, a catch closure inserted in the format part protrudes with a first portion thereof above the format part and a second portion thereof below the format part.

In another aspect, the invention features a method for exchanging a format part configured to guide containers in a container-handling installation. Such a method includes releasing a catch closure that connects a first format part and a locking device by turning an actuation unit connected to the catch, turning the catch from a locked second position to an unlocked first position, removing the format part vertically away from the container-handling installation, inserting a second format part vertically into the container-handling installation, turning a catch arranged on the second format part from the first position to the second position, and bracing the second format part by a further rotation of the actuation unit.

In some embodiments, a rotation required to release the bracing force is less than 360 degrees. In some of these embodiments, a quarter turn of an actuating unit coupled to the catch closure releases the bracing. In other embodiments, a half turn of the actuation unit releases the bracing. In either case, the catch remains locked on the locking device. However, it is locked without the additional benefit of a firm bracing force.

A further rotation of the catch releases the lock. This occurs, in some embodiments, from movement of the catch from a second position to a first position in which the catch is turned out of the locking device. Once the catch is in the first position, the format part can easily be removed from the container-handling installation. In particular, since the format part is no longer locked to the container-handling installation, it can be removed vertically by applying a force acting along a longitudinal axis of the container-handling installation.

To install a new format part, one simply inserts the catch closure vertically into the container installation and turns the catch arranged on the catch closure of the second format part through a part rotation from its first position to its second position, thus locking the format part to the container-handling installation. For firm bracing of the format part, a further rotation of the actuation unit takes place. This rotation too may be a rotation that is less than 360 degrees, for example a 90-degree turn, a 120-degree turn, or a 180-degree turn.

Rotary catch compression closures, which perform a corresponding two-stage locking and bracing of the catch arranged thereon, are particularly suitable as catch closures.

The method allows rapid release of format parts and secure and rapid fixing of the format parts. The vertical removal of the format part makes it easy to remove the format part even when there are foreign bodies, such as glass splinters, nearby.

In one aspect, the invention features an apparatus comprising a container-handling installation that includes an exchangeable format part that guides containers through the container-handling installation and a catch closure that connects the format part in a releasable manner to the locking device. The catch closure includes a catch that rotates between a first position, in which it releases the format part, and a second position, in which it locks the format part. The catch closure, which is on an upper format part plane, sustains a bracing force along a longitudinal direction thereof, as a result of which the catch closure and the locking device are braced against each other. A locking device oriented around the catch closure includes a vertical web extending between a connecting device and a locking tab. The connecting device fixes the locking device to a body of the container-handling installation.

Some embodiments include an actuation unit, a first rotation of which causes the catch to turn between the first and second position, and a second rotation of which causes the bracing force.

Embodiments include those in which the locking device includes a recess for engagement with the catch, those in which it includes an engagement device corresponding to the catch for positioning of the catch on the locking device, and those in which it includes a positioning device for positioning of the format part.

In some embodiments, the catch closure comprises a rotary handle for causing the catch to transition from the catch to rotate. Among these are embodiments in which the rotary handle is configured such that when the rotary handle is rotated, the catch fails to rotate, and embodiments in which the catch closure is configured to receive first and second torques via the rotary handle. The catch closure converts the first torque into a second torque to rotate the catch and converts the second torque into a bracing force acting along an axis of rotation of the rotary handle.

Some embodiments include a lower format part plane that is parallel to the upper format part plane.

Other embodiments include those in which the locking tab has an edge that defining an aperture. In these embodiments, the locking tab is disposed such that the catch protrudes through the aperture in the second position and is outside the aperture in the first position.

In another aspect, the invention features a container-handling installation includes an exchangeable format part for guiding containers, and a catch closure for connecting the format part in a releasable manner to a locking device. The catch closure has a catch on an upper format plane. The catch rotates between a first, in which it releases the format part, and a second position, in which it locks it. The catch closure fixes and braces the format part and locking device, which is oriented around the catch closure, has a vertical web with a locking tab corresponding to the catch. A connecting device arranged on a side of the locking device opposite the locking tab fixes the locking device to a body of the container-handling installation.

As used herein, "release" refers to the relief of the bracing force that firmly braces the format part to the locking device.

As used herein, "locking" means preventing removal of the format part from the container-handling installation.

As used herein, a format-part support refers to a body of the container-handling installation on which the format part can be rested and supported.

As used herein, the term "passing through" means complete passage of the catch closure through the format part.

BRIEF DESCRIPTION OF THE DRAWINGS

These and other features of the invention will be apparent from the following detailed description and the accompanying figures, in which:

FIGS. 1a-1c show a diagrammatic view of a catch closure arranged on a format part with a locking device.

DETAILED DESCRIPTION

FIGS. 1a to 1c show a portion of a format part for guiding containers. The format part includes an upper format part plane 1 and a lower format part plane 2. The upper format part plane 1 has a catch closure 3 that extends along a longitudinal axis B between a lower end 3a and an upper end 3b.

A rotary handle 3c rotates the catch closure 3 about its longitudinal axis B. The rotary handle 3c is arranged on a top surface 1a of the upper format part plane 1. As a result, the rotary handle 3c remains easily accessible to the user even when the format part is installed. A catch 5 mounted on a lower end of the catch closure 3 rotates in response to rotation of the rotary handle 3c.

A locking device 4 has a vertical web 4a that extends between a locking tab 4b and a connecting device 4c. The connecting device 4c fixes the locking device 4 to a body of the container-handling installation.

The locking tab 4b selectively engages the catch 5. To facilitate such engagement, the locking tab 4b has an engagement recess 6 formed thereon. A curve of this engagement recess 6 conforms to a corresponding curved profile of the catch 5.

FIG. 1a shows the catch 5 in a released position. With the catch 5 in this released position, the format part can be removed vertically from the container-handling installation.

FIG. 1b shows the catch 5 after the rotating handle 3c has undergone a first counter-clockwise rotation of around 90° into an engaging position. In this engaging position, the catch 5 engages the locking tab 4a. In particular, the rotation seats the catch 5 in the engagement recess 6. As a result, the catch 5 blocks the format part so that it cannot be removed from the container-handling installation.

FIG. 1c shows the catch closure 3 after the rotary handle 3c has undergone a second counter-clockwise rotation of around 90°. In this position, the catch 5 continues to engage the engagement device 6. However, as a result of the second rotation, the catch closure 3 is also braced to the locking device 4.

The bracing occurs because the second counter-clockwise rotation of the rotary handle 3c rotates a rotary axis that extends along the longitudinal direction B of the catch 3. This rotary axis ultimately connects to a base 5a of the catch. Rotating the rotary axis draws the base 5a, and hence the entire catch 5, upward in the longitudinal direction B, and hence in the direction of the upper format part plane 1. This upward movement of the catch 5 results in a bracing force that braces the catch closure 3 to the locking device 4. The bracing force acts in the longitudinal direction B. This bracing force mounts the format part elements in a non-slip fashion to the locking device 4.

Having described the invention, and a preferred embodiment thereof, what we claim as new, and secured by Letters Patent is:

1. An apparatus comprising a container-handling installation, said container-handling installation comprising an exchangeable format part, a catch closure, a locking device, a catch, a vertical web, a connecting device, an upper format part plane, and a locking tab, wherein said exchangeable format part guides containers through said container-handling installation, wherein said catch closure connects said format part in a releasable manner to said locking device, wherein said catch closure comprises said catch, wherein said catch is configured to rotate between a first position and a second position, wherein, in said first position, said catch releases said format part, wherein, in said second position, said catch locks said format part, wherein said catch closure sustains a bracing force along a longitudinal direction thereof, wherein, as a result of said bracing force, said catch closure and said locking device are braced against each other, wherein said catch closure is arranged on said upper format part plane, wherein said locking device comprises said vertical web, said connecting device, and said locking tab, wherein said vertical web extends between said connecting device and said locking tab, wherein said locking device is oriented around said catch closure, wherein said locking tab is configured to conform to said catch, and wherein said connecting device is configured to fix said locking device to a body of said container-handling installation.

2. The apparatus of claim 1, further comprising an actuation unit, wherein a first rotation of said actuation unit causes said catch to turn between said first and second position, and a second rotation of said actuation unit causes said bracing force.

3. The apparatus of claim 1, wherein said locking device comprises a recess for engagement with said catch.

4. The apparatus of claim 1, wherein said locking device comprises an engagement device corresponding to the catch for positioning of said catch on said locking device.

5. The apparatus of claim 1, wherein said locking device comprises a positioning device for positioning of said format part.

6. The apparatus of claim 1, wherein said catch closure comprises a rotary handle for causing said catch to transition from said catch to rotate.

7. The apparatus of claim 6, wherein said rotary handle is configured such that when said rotary handle is rotated, said catch fails to rotate.

8. The apparatus of claim 6, wherein said catch closure is configured to receive a first torque via said rotary handle and to convert said first torque into a second torque to rotate said catch, and to receive a second torque via said rotary handle and to convert said second torque into a bracing force acting along an axis of rotation of said rotary handle.

9. The apparatus of claim 1, further comprising a lower part plane that is parallel to said upper part plane.

10. The apparatus of claim 1, wherein said locking tab comprises an edge defining an aperture, wherein said locking tab is disposed such that said catch protrudes through said aperture in said second position and is outside said aperture in said first position.

* * * * *